US012118631B1

(12) United States Patent
Krause

(10) Patent No.: US 12,118,631 B1
(45) Date of Patent: Oct. 15, 2024

(54) PROJECT COST SYSTEM AND METHOD FOR A PRECISE AUTOMATED CONSTRUCTION

(71) Applicant: Richard A. Krause, Arlington Heights, IL (US)

(72) Inventor: Richard A. Krause, Arlington Heights, IL (US)

( * ) Notice: Subject to any disclaimer, the term of this patent is extended or adjusted under 35 U.S.C. 154(b) by 317 days.

(21) Appl. No.: 17/508,277

(22) Filed: Oct. 22, 2021

Related U.S. Application Data

(63) Continuation-in-part of application No. 17/492,246, filed on Oct. 1, 2021, and a continuation-in-part of application No. 17/133,714, filed on Dec. 24, 2020, now Pat. No. 11,321,791.

(60) Provisional application No. 63/094,963, filed on Oct. 22, 2020.

(51) Int. Cl.
| | |
|---|---|
| *G06Q 50/08* | (2012.01) |
| *G06F 9/54* | (2006.01) |
| *G06F 16/25* | (2019.01) |
| *G06Q 10/06* | (2023.01) |
| *G06Q 10/0631* | (2023.01) |
| *G06Q 30/0601* | (2023.01) |
| *G06Q 40/00* | (2023.01) |
| *G06Q 40/12* | (2023.01) |

(52) U.S. Cl.
CPC ............ *G06Q 50/08* (2013.01); *G06F 9/547* (2013.01); *G06F 16/258* (2019.01); *G06Q 10/06312* (2013.01); *G06Q 10/06313* (2013.01); *G06Q 30/0611* (2013.01); *G06Q 40/12* (2013.12)

(58) Field of Classification Search
CPC .. G06Q 50/08; G06Q 40/12; G06Q 10/06312; G06Q 10/06313; G06Q 30/0611; G06Q 10/06; G06F 16/258; G06F 9/547
USPC .......................................................... 705/50
See application file for complete search history.

(56) References Cited

U.S. PATENT DOCUMENTS

| | | | | |
|---|---|---|---|---|
| 10,831,944 | B1 * | 11/2020 | Giattina ................. | G06F 30/13 |
| 2006/0015475 | A1 * | 1/2006 | Birkner ................. | G06Q 50/08 |
| 2012/0124484 | A1 * | 5/2012 | Robinson .............. | G06Q 10/00 |
| | | | | 715/753 |

* cited by examiner

*Primary Examiner* — Ariel J Yu
*Assistant Examiner* — Denisse Y Ortiz Roman
(74) *Attorney, Agent, or Firm* — Christopher J. Scott

(57) ABSTRACT

A project cost module-based system according to the present invention gathers and summarizes the total cost of the project and organizes it into a detailed line-item format. The project cost module-based system matches up and confirms the quantity and types of all required materials, labor, and equipment. This project cost module-based system has the ability to understand the electronic design and basic schedule duration constraint data that is fed into it and knows, item by item, how to pinpoint required materials or equipment. This is done with its own built-in intelligence that is generated from a combination of historic data, basic logic, learned adjustments, barcoding, and other identification methods. Then, preferably by way of its own built-in intelligence/database or alternatively by way of other market databases, the project cost module-based system solicits pricing for that material.

20 Claims, 1 Drawing Sheet

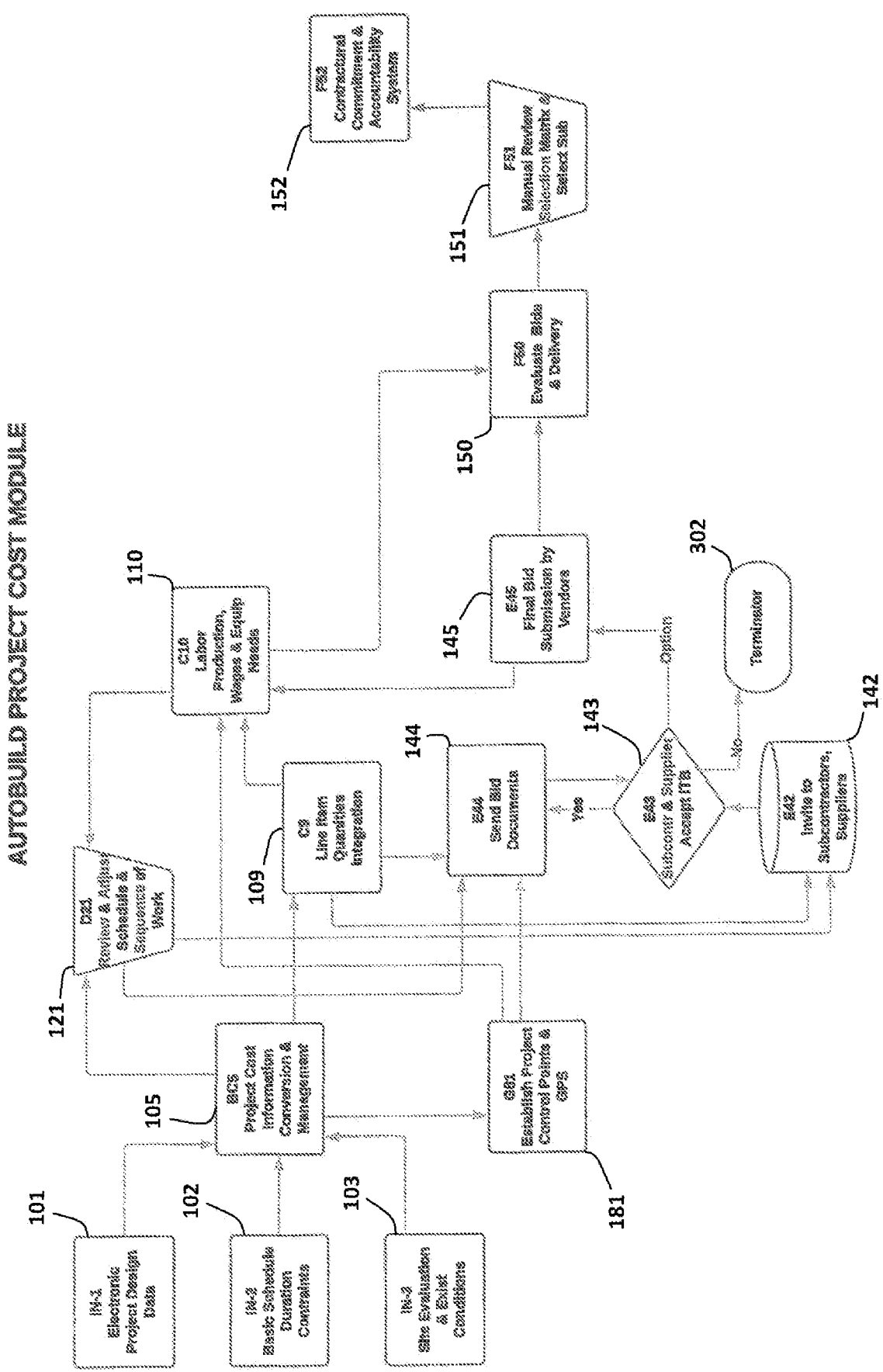

PROJECT COST SYSTEM AND METHOD FOR A PRECISE AUTOMATED CONSTRUCTION

PRIOR HISTORY

This application claims the benefit of U.S. Provisional Patent Application No. 63/094,963 filed in the United States Patent and Trademark Office (USPTO) on 22 Oct. 2020; is a Continuation-in-Part application of pending U.S. patent application Ser. No. 17/133,714 filed in the USPTO on 24 Dec. 2020; and is a Continuation-in-Part application of pending U.S. patent application Ser. No. 17/492,246 filed in the USPTO on 1 Oct. 2021, the specifications and drawings of which applications are hereby incorporated by reference thereto.

FIELD OF THE INVENTION

These specifications generally relate to a system for managing a construction project, and more particularly to a software module-based system that automates the determination of the cost of a project by reading the Project Design Data to allow for the current manual methods or automated construction processes.

BRIEF DESCRIPTION OF THE PRIOR ART

US Patent Application Publication No. 2020/0151937, authored by Miller (937 publication), discloses a Method and System for Construction Project Management Using Photo Imaging Measurements. The '937 publication describes harnesses the use of photo imaging and measurement capture for use by do-it-yourselfers, handymen and small contractors. The method and system operates on mobile computing devices and includes an image recognition system. By performing various imaging-based measurements and then processing the resultant data, the method and system produces bills of materials. invoices, and receipts for the necessary tools and materials required by the construction project.

US Patent Application Publication No. 2020/0027043, authored by Agassi, et al. ('043 publication), discloses a Construction Project Management System and Method Thereof. The '043 publication describes a management system including processing circuitry and a memory, the memory containing instructions that, when executed by the processing circuitry, configure the system to: analyze a project data of a construction; based on the analysis of the project data, derive metadata associated with the construction project, wherein the metadata designates at least various stages associated with the construction project, and a completion threshold for each stage; and based on the metadata, generate an interface for allowing at least two end-user devices to collaboratively interact with the interface, wherein the interface provides interactive visual features indicative of a progress of each of the stages associated with the construction project.

US Patent Application Publication No. 2019/0003153, authored by Shike, et al. ('153 publication), discloses a Construction Management System, Construction Management Method, and Management Device. The '153 publication describes a management system including an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

US Patent Application Publication No. 2019/0026843, authored by Kim ('843 publication), discloses a Method for Integrated Management Including Building Construction and Maintenance Based on Video. The '843 publication describes a video-based integrated building construction and maintenance management method in which a series of processes of building construction and maintenance after build completion is produced as a video and registered in a building management server. The video is configured to be checked by a building owner or resident so that a building can be transparently managed by fundamentally preventing faulty construction that may occur during a construction step and untrustworthy maintenance.

US Patent Application Publication No. 2018/0332102, authored by Sheidaei ('102 publication), discloses a Cloud-Based System for Collaborating Engineering, Operations, Maintenance, Project Management, Procurement, and Vendor Data and Activities. The '102 publication describes certain systems and methods operable via a cloud platform utilizing Artificial Intelligence (AI). The system is configured to connect with a computerized application to store and manage data and activities of one or more departments.

The system enables vendors to access the data of one more departments to perform vendor activities such as generating quote documents. The system is further configured to provide a bid evaluation including a list of one or more vendor comprising products matching the requirements of the one or more departments. The system further enables personnel of one or more departments to select at least one vendor for placing orders and enables the selected vendor to submit data required by the personnel of one or more departments to collaborate data or for procurement.

US Patent Application Publication No. 2018/032225, authored by Schwartz ('225 publication), discloses a System for On-Site Tracking, Managing, Planning and Staging Construction Projects. The '225 publication describes a construction management system for allowing a user to capture an item identifier from an item (e.g., shipment, group of components, and/or one or more components) using a mobile device. The item identifier may be used to identify a project and access a model for the product, identify a component in a model, and/or identify the components in a shipment for staging purposes.

Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

US Patent Application Publication No. 2018/0209156, authored by Pettersson ('156 publication), discloses a Construction Management System and Method. The '156 publication describes a construction management system for constructing a building including at least one heavy lifting machine for moving a one building element to a mounting position on the building, a central computing unit providing a building information model comprising at least a construction plan comprising a target state of the building construction, a three-dimensional model of an actual construction state of the building, and a three-dimensional model of the element, wherein the central computing unit is adapted to determine the mounting position for the element based on the construction plan, the model of the current construction state and on the model of the element.

US Patent Application Publication No. 2018/0174250, authored by Faulkner ('250 publication), discloses certain Construction Project Management Systems and Methods. The '250 publication describes an operation including the steps of generating a project profile for a construction project, determining project details of the project, determining a regulatory process to be performed during the project based on the project details and regulatory rules, determining worker's certificates or licenses corresponding to the regulatory process and the project details, determining candidate workers for the construction project from registered workers, and causing a first GUI for selection of one or more candidate workers to be generated. The first GUI includes indicators of statuses of the worker's certificates or licenses corresponding to the regulatory process with respect to each of the one or more candidate workers.

US Patent Application Publication No. 2017/0278037, authored by Pettersson ('037 publication), describes a Construction Management System and Method for Linking Data to a Building Information Model. The '037 publication describes a construction management system comprising a plurality of sensor means adapted to detect events at a building site of the structure, a central computing unit providing a three-dimensional model of the building site, and at least one displaying device that is adapted to display the three-dimensional model to a user. The sensor means are adapted to generate data comprising information about a detected event.

The system further comprises communication units adapted to transmit a message comprising the data and a location information to the central computing unit, assign coordinates in the three-dimensional model according to the location information, evaluate options for reacting on the event by analyzing the data, assign evaluated options to the data, and display a note which is related to evaluated options to the user in real-time at the assigned coordinates in the three-dimensional model.

U.S. Pat. No. 10,831,944 ('944 patent), issued to Giattina, discloses a System and Method to Facilitate the Design, Manufacturing and Construction of Structures. The '944 patent describes a system that facilitates the building of a structure according to a project architectural design plan. The system provides standardized information to participants associated with a project based on the project design plan. The project architectural design plan can be compliant with one or more standards stored by the system. The project design plan can also incorporate information regarding products that are utilized in the project such as a plurality of prefabricated building modules. The requirements for a product are dictated by the standards established for the product and the project. Information about products used in the project can be embedded in links of the project architectural design plan.

U.S. Pat. No. 10,593,104 ('104 patent), issued to Robert, et al., discloses certain Systems and Methods for Generating Time Discreet 3D Scenes. The '104 patent describes certain methods, systems, and apparatus including medium-encoded computer program products for generating and visualizing 3D scenes of a build-site. The invention may be said to include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data. The methodology further reconstructs and outputs a series of three dimensional (3D) modeled scenes of the physical site from the site data using the imaging data, the coordinate data, and the time metadata.

Generally considering the state of the art exemplified by the patent publications briefly described above, the reader will bear in mind certain shortcomings in the construction industry at least insofar as its relatively low-level digitalization is concerned. In other words, the reader will note from a consideration of the foregoing that the state of construction industry art perceives a need for a digitalized comprehensive construction project management system that receives design component data from an outside design provider, converts the design component into a standardized format for use by a plurality of interconnected system-supportive, software-based modules to advance the initial design component data from design concept to final build all within a system of full or near-full automation. What follows is a summary of a first non-transitory, computer-implementable software-based application or module supportive of a comprehensive construction project management system otherwise described more fully in U.S. patent application Ser. No. 17/133,714 ('714 application), from which this application claims a benefit and builds thereupon.

SYSTEM BACKGROUND AND SUMMARY

In the world's pursuit to automate the construction industry there is a perceived need to develop a more comprehensive cost estimating system that goes beyond what exists in the market today. A cost estimating system is needed that can take information provided from the electronic design along with basic schedule constraint information fed into it, then read and decipher it down to the smallest details from large components and equipment to the smallest connection materials such as closure trim, screws, nails, adhesives etc. In a short amount of time (days or hours) in an Artificial Intelligence or AI-automated manner, provide a comprehensive detailed cost of the entire project by pricing all materials, delivery (whether human driven or by drone), labor (whether human or robotic), and equipment required. Because of the ability of this system to calculate assembly production durations it provides input and confirmation that basic schedule duration constraints can be met. The AUTOBUILD PROJECT COST MODULE according to the present invention meets these objectives.

The working parts of the AutoBuild Project Cost Module otherwise illustrated as the Project Cost Information Conversion and Management component in the illustrative support for these specifications, in concert with related elements within these specifications together cooperate with one another to generally vet and correct a project design to ensure its competency down to the most minor details. This is necessary in the modern world simply to avoid the number of errors and delays that take place on a construction site. Vetting and/or correcting project designs is a critical aspect of the Project Cost Information Conversion and Management software component to provide precise and accurate information and direction to enable computers, robots, drones, etc. (i.e., non-human participants) to carry out a project design in an automated manner. The Project Cost Information Conversion and Management component vets at least the following: design intent; compatibility of materials and their connections to other materials; material strengths; structural integrity; moisture contents; colors; precise locations in the intended three-dimensional envelope, etc. The Project Cost Information Conversion and Management component very basically ensures the project design and information provided in support thereof are competent, compatible, and comprehensive toward the intended design.

The AUTOBUILD PROJECT COST MODULE-based System and Method according to the present invention gathers and summarizes the total cost of the project and organizes it into a detailed line-item format. This module matches up and confirms the quantity and types of all required materials, labor, and equipment. This module has the ability to understand the electronic design and basic schedule duration constraint data that is fed into it and knows, item by item, how to pinpoint required materials or equipment. This is done with its own built-in intelligence that is generated from a combination of historic data, basic logic, learned adjustments, barcoding, and other identification methods. Then, preferably by way of its own built-in intelligence/database or alternatively by way of other market databases, the AUTOBUILD PROJECT COST MODULE solicits pricing for that material.

The module according to the present invention knows how to pinpoint any material or equipment item that requires physical assembly labor and from its database of production and labor costs it calculates required labor cost for the project. This module also can alert and reach out to the industry that provides such labor (whether by human or robotic) to receive comparative pricing. Currently there are vendor solicitation software products in the market that will have the ability to plug into this AUTOBUILD PROJECT COST MODULE in order to help facilitate the vendor solicitation process. By each of the vendors providing quotations, it compares those to the built-in database of material cost and manhour production estimates as a check and balance for the overall cost accuracy of the module.

This module further assesses and provides scope completeness, bidder irregularities, bidder exceptions, exclusions, qualifications, schedule duration compliance, etc. to provide a competent Bid Compare Process resulting in a best, reliable vendor to be selected to enter into a mutual contractual commitment. At this point, a manual approval event requires human intervention or oversight whether by way of an individual or team of a general contractor, owner of project, and/or design entity to approve the line-item summary in order to proceed to the next steps of entering into contractual commitments and commencement of the procurement and construction process. This module is also the stage in which modifications can be made to the design with value-engineering exercises to adjust the design and specifications if the calculated cost of the project is not of satisfaction.

With the recommended design modifications made from the design and/or construction team, the system can be rerun to develop a new revised total cost summary based on the changes prior to entering contractual commitments. Once the total cost of the project and basic schedule duration compliance is acceptable and approved, with the push of a button opened with a security code, this AUTOBUILD PROJECT COST MODULE develops a contractual agreement with any and all vendors that have provided the best value proposal as evaluated by this AUTOBUILD PROJECT COST MODULE to commit to a cost, schedule, and criteria of required quality conformance.

BRIEF DESCRIPTIONS OF THE DRAWINGS

Other features and objectives of the present invention will become more evident from a consideration of the following brief description of the patent drawing submitted in support of these specifications.

FIG. 1 is a flowchart diagram depicting a centralized or hub-like System Conversion and Data Entry software module or node in downflow communication from a singular Project Design Data software module or node with a first series of branching software modules or nodes in downflow communication from the System Conversion and Data Entry software module.

DETAILED DESCRIPTION OF THE PREFERRED EMBODIMENT

In describing the invention made the subject of these specifications, since AUTOBUILD PROJECT COST is a subpart or subsystem to an overall software-based construction automation process (i.e., an automated construction process without necessarily needing human intervention), it is here referred to as a Module, or in this case Module C. A software program may comprise numerous modules as separate executable files that form parts of a whole program. A module is a software component or part of a program that contains one or more routines. One or more independently developed modules make up a program. An enterprise-level software application may contain several different modules, and each module serves unique and separate business operations. Given the complexity of the overall operating system, the author has selected the term module to describe the software modules that together cooperate to provide or support the Comprehensive Construction Project Management System of U.S. patent application Ser. No. 17/133,714 ('714 application) from which this application claims a benefit and is a Continuation-in-Part Application.

The reader is firstly directed to the central or hub-like Project Cost Information Conversion & Management Node BC5 (105) software module component made the central focus of U.S. patent application Ser. No. 17/492,246 from which this application also claims a benefit and is a Continuation-in-Part Application. The BC5 Node (105) accumulates the information inputted into it as it relates to the Project Design Data Node (101); the Basic Schedule Duration Constraints Node (102); and the Site Evaluation & Existing Conditions Node (103), which Nodes (101), (102), and (103) feed data into the BC5 Node (105).

The Project Design Data Node (101); the Basic Schedule Duration Constraints Node (102); and the Site Evaluation & Existing Conditions Node (103) are available state of the art nodal contributors and not necessarily part of this product submission, although the present system intakes data fed therefrom to provide the described functionality. In other words, Node BC5 (105) takes the information provided by Nodes (101), (102), and (103), and converts and organizes the received information in a manner that can be sent to downstream nodes, including the Line-Item Quantities Integration C9 Node (109); the Review & Adjust Schedule and Sequence of Work D21 Node (121), and the Establish Project Control Points and GPS G81 Node (181). The C9, D21, and G81 Nodes (109), (121), and (181) together formulate the basis in which a comprehensive estimate can be developed.

The C9 Node (109) is a Line-Item Quantity Integration Node, in unidirectional downflow communication with the Project Cost Information Conversion & Management BC5 Node (105), and creates the first stage of the cost estimate summary by tabulating data as received from the BC5 Node (105). The Line-Item Quantity Integration C9 Node (109) organizes all products needed for the project with the required quantity in a spreadsheet-like format and further communicates the organized information clearly so that associated costs can be solicited. The C9 Node (109) communicates with the Subcontractor and Supplier Invite Node E42 (142) (i.e. an Invitation to Prequalified Subcontractors & Suppliers Node (142)) for identifying piece-by-piece building requirements and tapping into a resource database as built into Subcontractor and Supplier Invite Node (142).

Node C10 (110) is a Labor Production, Wages, and Temporary Materials & Equipment Node is in unidirectional downflow communication with the Line-Item Quantity Integration Node (109). The Labor Production, Wages, and Temporary Materials & Equipment Node (110) identifies all items in Node (109) that require labor, permanent & temporary materials & equipment to assemble parts of the project. Node (110) thus receives the product line item and quantity from Node (109) and calculates the standard production that will be required to put the product in place.

The C10 Node (110) also considers the level of difficulty or ease with which the proposed production could be carried out and make final adjustments to that production. This node understands the wage rates in which the project is located and utilizes those wage rates in calculating the total labor cost for that line item. In this regard, it is contemplated that manual labor is becoming increasingly replaced by automated means. Accordingly, construction projects are becoming increasingly automated. The AUTOBUILD PROJECT COST MODULE according to the present invention is designed to embrace these automated assembly methods by way of Node C10 (110).

In other words, the C10 Node (110) is designed to constantly evolve as automation of labor enters the industry. Notably, many aspects of a build project require not only manual labor, but also permanent/temporary materials and equipment to support the labor/assembly function. Examples of temporary equipment may include machinery used for demolition and excavation; formwork for pouring concrete; shoring and/or scaffolding material; equipment utilized for earth retention or access to higher portions of a facility; temporary enclosures which are utilized for traffic control or maintaining heated environments within colder working conditions, etc. The temporary materials and equipment are very much associated with the labor requirements of the project and not as clear-cut as a direct, permanent line item. These temporary materials and equipment are thus identified and costed by way of the C10 Node (110).

The C10 Node (110) is further utilized to create an initial cost estimate of assembly labor for the project and is utilized as a resource and comparison to the subcontractor market that shall be bidding and providing firm contractual cost commitments to the project. Information from the C10 Node (110) is also utilized to compute the basic project schedule function for the D21 Review & Adjust Schedule and Sequence of Work Node (121) in downflow communication with the C10 Node (110). The C10 Node (110) is further utilized to confirm and evaluate the total cost bid evaluation function of the Evaluate Bids and Delivery Node F50 (150) in downflow communication with Node C10 (110).

The D21 Review & Adjust Schedule and Sequence of Work Node (121) comprises standard assembly intelligence built into its system to give the general guideline of schedule requirements by gathering labor productions; and produces a preliminary project schedule based on this information. The D21 Node (121) further considers site logistics, level of difficulty of project, effects of weather from the region, etc. The schedule produced is easily legible and understood by a construction professional with ordinary level of skill or construction assembly knowledge. The D21 Node (121) is available to vendors to review and comment on its accuracy which will alert the operator for any reevaluations that may be deemed necessary. The D21 Node (121) further has the capability to be manually adjusted.

The G81 Establish Project Control Points & GPS Node (181) combines the information from the design and site evaluation in existing conditions provided from the BC5 Node (105) and develops the basic three-dimensional controls that will be used throughout the project. The G81 Node (181) is essential and provides assistance in considering all types of site conditions such as existing structures on the site, existing utilities, topographic elevations of the site, water flow and sheeting across the site, locations of existing curbs, paving, and other traffic rights-of-way etc. in order to complete a proper and accurate estimate.

The E42 Node (142) is an Invitation to Prequalified Subcontractors & Suppliers Node in downflow communication with the C9 Node (109). The E42 Node (142) interprets information sent to it from the C9 Node (109) concerning products and quantities needed for the project along with the initial schedule and sequence information provided by the D21 Node (121). The information received is compared against the information stored in the database for subcontractors and suppliers to utilize and to whom bid solicitations may then be sent as at envelope as depicted by the E43 Node (143) and described as a Vendor Invitation to Bid Acceptance Node in downflow communication with the E42 Node (142).

The bid invite/solicitations sent out by the E42 Node (142) contain initial information concerning product specifications along with associated quantities needed for the project and further sets forth preferred/required dates for product delivery and/or installation scheduling as governed by the D21 Node (121). This process allows the vendor to decide on whether to respond to the invitation to bid. The information format sent by the E42 Node (142) allows vendors to interpret and assess either manually by a human operator or by way of an automated system with a subsequent response or answer to the invitation communicated back into the automated language of the AUTOBUILD PROJECT COST MODULE.

As prefaced above, the E43 Node (143) is a Vendor Invitation to Bid Acceptance query type Node in downflow communication with the E42 Node (142). The E43 Node (143) is simplistic in design and manages those vendors indicating an interest in the project and indicating a commitment to respond to the invitation to bid. Once a vendor accepts the Invitation to Bid or ITB, the E43 Node (143) initiates a further transmission of the balance of detailed bid document information to responding vendor. Non-accepting vendors are eliminated from the system as at end/terminate symbol (302).

The E44 Node (144) is a Send Final and Complete Bid Documents Node. The E44 Node (144) is a secondary brain according the present invention that assembles or compiles all final information concerning details of scope of work and required performance time and transmits this compiled information to all vendors that have accepted the bid invitation. The bid documents sent out by the E44 Node (144) comprise final detailed information concerning product specifications along with their associated quantities needed for the project and sets forth required dates for delivery and installation scheduling governed by the D21 Node (121).

The information formatting sent by the E44 Node (144) allows vendors to interpret and assess either manually by way of a human operator or by way of automated means and responded to by the automated language for which the system is programed. The vendors are provided with AUTOBUILD PROJECT COST MODULE system formats that the vendors can input in their own respective customized response data centers with parameters in order to automate vendor pricing for the line items in bidding and for confirmations that the individual vendors can meet the required completion time on the project The E45 Node is a Final Bid Submission by Vendors Node (145). The E45 Node (145) allows a vendor to transmit its bid response which can be done manually if it conforms to the AUTOBUILD PROJECT COST MODULE input system or in an automated manner that is communicated through the format provided by the AUTOBUILD PROJECT COST MODULE system. A final bid submission will be required by the vendor(s) and managed by this node to confirm the vendor commitment(s) to meet the delivery date for its portion of the project.

The reader will note that the E45 Node (145), to some extent, lies outside of the central AUTOBUILD PROJECT COST MODULE mechanics only to the extent it can be controlled by the vendor with its own response data and parameters. This node information can then be used in the F50 Node (150) in downflow communication with the E45 Node (145) to be evaluated. When approved, the vendor will be notified by the F52 Node (152) and contracted to begin to manufacture, deliver, and or build its line item of the project.

The F50 Node (150) is an Evaluation of Bids and Project Delivery Time Node. The F50 Node (150) gathers all information, contract requirements, and bids received, and evaluates, in a chronological order, the lowest responsible bidder that can also meet the scheduled time of completion for its line item. For each line item, this node ranks in order of the best bid received and provides a listing of criteria with exemplary indicators (e.g. plusses and minuses) for each bidder in a sequential manner as it goes down the listing of criteria.

The F50 Node (150) further functions to consider and compare the information provided by the C10 Labor, Production, Wages & Equipment Needs Node (110) to help assess whether the bids provided are within certain parameters or are close to anticipated bid expectations. This node compares the bids for each line item of the project. Each line item shall show the scope comparison down to the finest details in order to make sure that the bids being compared are apples to apples. The general categories of comparison shall be detailed listing of materials, confirmation that required labor is included, confirmation of required quality of material and labor, confirmation schedule constraints shall be met, confirmation that the vendor has the capacity to meet all requirements, cost, etc.

This F50 Node (150) shall list the bid of best value meeting all project requirements. This F50 Node (150) also compiles and adds all costs for elements of the project to provide the total cost of the project for review. Should the total cost exceed owner/customer expectations and budget, the F50 Node (150) allows for adjustment and value engineering input to be implemented for selected line items to be then rebid developing a new adjusted total cost for the project.

The F51 Node is a Manual Review and Matrix of Vendor Selection Node (151) in downflow communication with the F50 Node (150). The F51 Node (151) allows the collaboration and independent review of a human operator to confirm which bid the owner/customer wishes to utilize as the lowest responsible bidder from the vendor selection otherwise provided by the AUTOBUILD PROJECT COST MODULE according to the present invention. The F51 Node (151) thereby provides an important check and balance for the AUTOBUILD PROJECT COST MODULE. The F51 Node (151) is the last modular step before entering into contractual commitments with the vendor(s) and establishing project costs.

As prefaced above, the F52 Node is a Contractual Commitment and Accountability System Node (152) at which node contract agreements are populated in downflow communication with the F51 Node (151). The F52 Node (152) essentially confirms in written detail the scope of work to be provided along with performance criteria including schedule requirements and drafts/provides a legal contract document to be approved and executed by the vendors.

While the above descriptions contain much specificity, this specificity should not be construed as limitations on the scope of the invention, but rather as an exemplification of the invention. The foregoing specifications are contemplated to essentially provide a project cost-estimating system operable within a construction project management system as generally illustrated in FIG. 1 within a construction project management system as generally described and illustrated in more detail in the '714 application.

The project cost-estimating system according to the present invention may be said to essentially comprise a series of networked computers, and a series of computer-implementable software-based modular components. The series of networked computers are in communication with one another and configured to implement a series of non-transitory, computer-implementable, software-based modular components allowing particularized directional inter-module communication therebetween.

The series of computer-implementable, software-based modular components essentially comprise a centralized or hub-like project cost information conversion and management software module component as at 105. The centralized project cost information conversion and management software module component 105 receives data from at least one upstream software module component source and sends data to at least downstream software module component.

The centralized project cost information conversion and management software module component 105 preferably receives digital design data for a designed project as received from a design provider and converts the digital design data into a revised format for enabling and supporting peripheral software module components in networked, inter-module communication with the centralized design input conversion and management software module component thereby enabling peripheral software module component functionality most particularly downstream therefrom.

The centralized project cost information conversion and management software module component 105 is preferably in unidirectional downstream communication with the at least one, but preferably a series of design data software module components. The upstream software module component(s) are preferably a design data software module component as generally described and referenced at electronic project design data module component 101, basic schedule duration constraints module component 102, and site evaluation and existing conditions module component 103. The series of design data software module components are preferably in direct parallel communication with the centralized project cost information conversion and management software module component 105.

Depending from the centralized project cost information conversion and management software module component 105 is at least one downstream, but preferably several software module components exemplified firstly by the Line-Item Quantities Integration C9 Node as at 109. The downstream software module components receive data from the centralized project cost information conversion and management software module component and are configured to code and quantify every component of a finished design project as received from the centralized design input conversion and management software module component organizing coded and quantified components into a line-item cost accounting medium. The line-item cost accounting medium is configured to track every component of the designed project thereby allowing each component to be costed, contracted, procured, tracked, and delivered to a jobsite as required.

The line-item quantities integration software module component generally referenced at C9 or 109 is in downflow communication with the project cost information conversion and management as are also a review and adjust schedule and sequence of work software module component as referenced at D21 or 121, and an establish project control points and GPS software module component as referenced at G81 or 181. Together, the line-item quantities integration software module component, the review and adjust schedule and sequence of work software module component, and the establish project control points and GPS software module component are operable to formulate a basis in which a comprehensive cost estimate can be developed.

The line-item quantities integration software module component, the review and adjust schedule and sequence of work software module component, and the establish project control points and GPS software module component are each in unidirectional downflow communication with the centralized design input conversion and management software module component. A labor, production, wages and equipment needs software module component as referenced at C10 or 110 is preferably in unidirectional downflow communication with the line-item quantities integration software module component 109 and the establish project control points and GPS software module component 181. The review and adjust schedule and sequence of work software module component 121 is preferably in unidirectional downflow communication with the labor, production, wages and equipment needs software module component 110.

A send bid documents software module component as referenced at E44 or 144 is in unidirectional downflow communication with the line-item quantities integration software module component 109, the review and adjust schedule and sequence of work software module component 121, and the establish project control points and GPS software module component 181. An invite to subcontractors, supplier software module component as referenced at 142 is preferably in unidirectional downflow communication with the review and adjust schedule and sequence of work software module component 121 and the line-item quantities integration software module component 109.

A final bid submission by vendors software module component 145 is preferably in downflow communication with the send bid documents software module component 144 and the invite to subcontractors, supplier software module component 142 following subcontractor and supplier ITB acceptance. The labor, production, wages and equipment needs software module component 110 is in downflow communication with the final bid submission by vendors software module component 145. An evaluate bids and delivery software module component as referenced at F50 or 150 is preferably in downflow communication with the final bid submission by vendors software module component 145 and the labor, production, wages and equipment needs software module component 110.

Accordingly, although the data conversion system according to the present invention has been described by reference to a number of different features and aspects, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A project cost-estimating system for an automated construction, the project cost-estimating system comprising, in combination:
   a plurality of networked computers being in communication with one another and being configured to implement a plurality of non-transitory, computer-implementable, software-based components allowing directional inter-component communication therebetween and that comprises;
   a centralized project cost information conversion and management software component configured to:
      receive digital project design data for a project design from at least one upstream software component source;
      analyze the digital project design data for errors to properly enable and competently support downstream automation processes to competently support a complete construction of the project design in an automated manner;
      provide a mechanism for correcting or alerting a user to the errors for ensuring the digital project design data competently supports the project design and complete construction thereof;
      convert the digital project design data into a standardized data format that enables peripheral software components in networked, inter-component communication with the centralized project cost information conversion and management software component to perform automated peripheral software component functions;
      code and quantify every component of the project design organizing coded and quantified components into a line-item cost accounting medium; and
      send the digital project design data as converted to the standardized data format to at least downstream software component for enabling and competently supporting completion of the project design and construction thereof in an automated manner.

2. The project cost-estimating system of claim 1 wherein the at least one upstream software component source comprises a plurality of data input software components, the plurality of data input software components comprising an electronic project design data software component, a basic schedule duration constraints software component, and a site evaluation and existing conditions software component.

3. The project cost-estimating system of claim 2 wherein the centralized project cost information conversion and management software component is in inter-component communication with the plurality of data input software components and configured to receive the digital project design data for the project design and wherein the at least one downstream software component is in inter-component communication with the centralized project cost information conversion and management software component.

4. The project cost-estimating system of claim 1 wherein the line-item cost accounting medium is configured to track every component of the project design thereby allowing each component to be costed, contracted, procured, tracked, and delivered to a jobsite as required.

5. The project cost-estimating system of claim 1 comprising a line-item quantities integration software component, a review and adjust schedule and sequence of work software component, and an establish project control points and GPS software component, the line-item quantities integration software component, the review and adjust schedule and sequence of work software component, and the establish project control points and GPS software component together being operable to formulate a basis in which a comprehensive cost estimate can be developed.

6. The project cost-estimating system of claim 5 wherein the line-item quantities integration software component, the review and adjust schedule and sequence of work software component, and the establish project control points and GPS software component are each in inter-component unidirectional downflow communication with the centralized project cost information conversion and management software component.

7. The project cost-estimating system of claim 6 wherein a labor, production, wages and equipment needs software component is in inter-component communication with the line-item quantities integration software component and the establish project control points and GPS software component and the review and adjust schedule and sequence of work software component is in inter-component communication with the labor, production, wages and equipment needs software component.

8. The project cost-estimating system of claim 7 wherein a send bid documents software component is in inter-component communication with the line-item quantities integration software component, the review and adjust schedule and sequence of work software component, and the establish project control points and GPS software component.

9. The project cost-estimating system of claim 8 wherein an invite to subcontractors, supplier software component is in inter-component communication with the review and adjust schedule and sequence of work software component and the line-item quantities integration software component.

10. The project cost-estimating system of claim 9 wherein a final bid submission by vendors software component is in inter-component with the send bid documents software component and the invite to subcontractors-suppliers software component, and the labor, production, wages and equipment needs software component is in inter-component with the final bid submission by vendors software component.

11. The project cost-estimating system of claim 10 wherein an evaluate bids and delivery software component is in inter-component with the final bid submission by vendors software component and the labor, production, wages and equipment needs software component.

12. A project cost-estimating system operable within a computer network environment, the computer network environment being configured to implement a series of non-transitory, computer-implementable, software-based components allowing directional inter-component communication therebetween, the project cost-estimating system comprising:
a centralized project cost information design input conversion and management software component and at least one computer for implementing the centralized design input conversion and management software component configured to:
receive digital project design data from at least one upstream software component source;
analyze the digital project design data for errors to properly enable and competently support downstream automation processes to competently support construction of a project design in an automated manner;
provide a mechanism for correcting or alerting a user to the errors for ensuring the digital project design data competently supports construction of the project design;
convert the digital project design data into a standardized format that enables peripheral software components in networked, inter-component communication with the centralized project cost information conversion and management software component to perform automated peripheral software component functions;
code and quantify every component of the project design organizing coded and quantified components into a line-item cost accounting medium; and
send the digital project design data as converted to the standardized data format to at least downstream software component for enabling and competently supporting completion of the project design and construction thereof in an automated manner.

13. The project cost-estimating system of claim 12 wherein the at least one upstream software component source comprises a series of data input software module components, the series of data input software module components comprising an electronic project design data software component, a basic schedule duration constraints software component, and a site evaluation and existing conditions software component.

14. The project cost-estimating system of claim 12 wherein the line-item cost accounting medium is configured to track every component of the project design thereby allowing each component to be costed, contracted, procured, tracked, and delivered to a jobsite as required.

15. The project cost-estimating system of claim 12 comprising a line-item quantities integration software component, a review and adjust schedule and sequence of work software component, and an establish project control points and GPS software component, the line-item quantities integration software component, the review and adjust schedule and sequence of work software component, and the establish project control points and GPS software component together being operable to formulate a basis in which a comprehensive cost estimate can be developed.

16. The project cost-estimating system of claim 15 wherein a labor, production, wages and equipment needs software component is in inter-component communication with the line-item quantities integration software component and the establish project control points and GPS software component and the review and adjust schedule and sequence of work software component is in inter-component communication with the labor, production, wages and equipment needs software component.

17. The project cost-estimating system of claim 16 wherein a send bid documents software component is in inter-component communication with the line-item quantities integration software component, the review and adjust schedule and sequence of work software component, and the establish project control points and GPS software component.

18. The project cost-estimating system of claim 17 wherein an invite to subcontractors, supplier software component is in inter-component communication with the review and adjust schedule and sequence of work software component and the line-item quantities integration software component.

19. The project cost-estimating system of claim 18 wherein a final bid submission by vendors software component is in inter-component communication with the send bid documents software component and the invite to subcontractors-suppliers software component, and the labor, production, wages and equipment needs software component is in inter-component communication with the final bid submission by vendors software component.

20. The project cost-estimating system of claim 19 wherein an evaluate bids and delivery software component is in inter-component communication with the final bid submission by vendors software component and the labor, production, wages and equipment needs software component.

\* \* \* \* \*